United States Patent
Brew et al.

(10) Patent No.: US 10,168,683 B2
(45) Date of Patent: Jan. 1, 2019

(54) VEHICLE ELECTRONIC RECEPTIONIST FOR COMMUNICATIONS MANAGEMENT

(71) Applicant: International Business Machines Corporation, Armonk, NY (US)

(72) Inventors: Kevin W. Brew, Albany, NY (US); Michael S. Gordon, Yorktown Heights, NY (US); James R. Kozloski, New Fairfield, CT (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/826,988

(22) Filed: Nov. 30, 2017

(65) Prior Publication Data

US 2018/0348724 A1 Dec. 6, 2018

Related U.S. Application Data

(63) Continuation of application No. 15/614,809, filed on Jun. 6, 2017.

(51) Int. Cl.
*G05B 19/042* (2006.01)
*H04L 12/58* (2006.01)
(Continued)

(52) U.S. Cl.
CPC ....... *G05B 19/0425* (2013.01); *G05B 13/042* (2013.01); *G10L 15/1807* (2013.01); *H04L 51/046* (2013.01); *H04L 2012/40273* (2013.01)

(58) Field of Classification Search
CPC .............. G05B 19/0425; G05B 13/042; G10L 15/1807; H04L 51/046; H04M 1/6091;
(Continued)

(56) References Cited

U.S. PATENT DOCUMENTS

| 7,073,129 B1 * | 7/2006 | Robarts ................. G06Q 10/10 463/36 |
| 8,401,578 B2 | 3/2013 | Inselberg |

(Continued)

FOREIGN PATENT DOCUMENTS

| WO | 2009105666 A1 | 8/2009 |
| WO | 2016049717 A1 | 4/2016 |

OTHER PUBLICATIONS

Mell, P., et al., "The NIST Definition of Cloud Computing", NIST Special Publication 800-145, National Institute of Standards and Technology, U.S. Department of Commerce, Sep. 2011, pp. 1-7.
(Continued)

*Primary Examiner* — Orlando Bousono
(74) *Attorney, Agent, or Firm* — Scully, Scott, Murphy & Presser, PC; Kevin M. Jordan, Esq.

(57) ABSTRACT

A computer implemented method, system and computer program product for a receptionist function in vehicles for communications management, such as phone call and texting management, includes determining driving context of a moving vehicle, estimating a risk factor related to the operation of the vehicle based on the driving context, receiving an incoming communication directed to a mobile communication device within the vehicle, analyzing the incoming communication to determine a communication factor, and determining an electronic action in response to the incoming communication based on the driving context, the risk factor and the communication factor.

18 Claims, 5 Drawing Sheets

(51) Int. Cl.
  *G05B 13/04* (2006.01)
  *G10L 15/18* (2013.01)
  *H04L 12/40* (2006.01)

(58) Field of Classification Search
  CPC ......... H04M 1/72569; H04M 1/72577; H04W 4/027; H04W 48/04
  See application file for complete search history.

(56) References Cited

U.S. PATENT DOCUMENTS

| | | | |
|---|---|---|---|
| 8,655,965 B2 | 2/2014 | McWithey et al. | |
| 8,731,530 B1 | 5/2014 | Breed et al. | |
| 9,021,049 B2 | 4/2015 | Bai et al. | |
| 9,055,407 B1* | 6/2015 | Riemer | H04M 1/72569 |
| 9,809,169 B1* | 11/2017 | Naboulsi | B60R 1/025 |
| 9,818,136 B1* | 11/2017 | Hoffberg | G06Q 30/0282 |
| 2002/0120371 A1 | 8/2002 | Leivian et al. | |
| 2005/0192730 A1* | 9/2005 | Churchill | G08G 1/164 |
| | | | 701/45 |
| 2005/0255874 A1 | 11/2005 | Stewart-Baxter et al. | |
| 2006/0277474 A1* | 12/2006 | Robarts | G06Q 10/10 |
| | | | 715/745 |
| 2007/0087756 A1* | 4/2007 | Hoffberg | G06Q 10/0631 |
| | | | 455/450 |
| 2008/0299954 A1* | 12/2008 | Wright | H04W 4/02 |
| | | | 455/414.1 |
| 2008/0305779 A1* | 12/2008 | Wright | H04W 4/02 |
| | | | 455/414.1 |
| 2008/0318562 A1* | 12/2008 | Featherstone | H04W 4/02 |
| | | | 455/418 |
| 2009/0013052 A1* | 1/2009 | Robarts | G06F 17/30867 |
| | | | 709/206 |
| 2009/0253423 A1* | 10/2009 | Kullberg | H04M 1/66 |
| | | | 455/419 |
| 2009/0298482 A1* | 12/2009 | Yen | H04M 1/6075 |
| | | | 455/414.2 |
| 2010/0033333 A1* | 2/2010 | Victor | A61B 3/113 |
| | | | 340/576 |
| 2010/0131300 A1* | 5/2010 | Collopy | G06Q 30/0224 |
| | | | 705/4 |
| 2010/0153146 A1* | 6/2010 | Angell | G06Q 10/0635 |
| | | | 705/7.28 |
| 2010/0216509 A1* | 8/2010 | Riemer | H04M 1/72577 |
| | | | 455/557 |
| 2010/0317420 A1* | 12/2010 | Hoffberg | G06Q 30/0207 |
| | | | 463/1 |
| 2011/0004513 A1* | 1/2011 | Hoffberg | G06Q 30/0207 |
| | | | 705/14.1 |
| 2011/0009107 A1* | 1/2011 | Guba | G08G 1/20 |
| | | | 455/418 |
| 2011/0025527 A1* | 2/2011 | Chandra | G08G 1/161 |
| | | | 340/902 |
| 2011/0077028 A1* | 3/2011 | Wilkes, III | B60W 50/14 |
| | | | 455/456.3 |
| 2011/0263240 A1* | 10/2011 | Featherstone | H04W 4/02 |
| | | | 455/418 |
| 2012/0289217 A1* | 11/2012 | Riemer | H04M 1/72577 |
| | | | 455/418 |
| 2013/0038437 A1* | 2/2013 | Talati | B60K 35/00 |
| | | | 340/438 |
| 2013/0316737 A1* | 11/2013 | Guba | G08G 1/20 |
| | | | 455/456.4 |
| 2014/0046701 A1* | 2/2014 | Steinberg | G06Q 40/08 |
| | | | 705/4 |
| 2014/0081793 A1* | 3/2014 | Hoffberg | G06Q 30/0207 |
| | | | 705/26.3 |
| 2014/0113619 A1* | 4/2014 | Tibbitts | G07C 5/008 |
| | | | 455/419 |
| 2014/0235159 A1 | 8/2014 | Komistek | |
| 2014/0256258 A1 | 9/2014 | DeLuca | |
| 2014/0277932 A1* | 9/2014 | Prakah-Asante | B60K 28/02 |
| | | | 701/36 |
| 2014/0300739 A1* | 10/2014 | Mimar | H04N 7/188 |
| | | | 348/148 |
| 2015/0025917 A1* | 1/2015 | Stempora | G06Q 40/08 |
| | | | 705/4 |
| 2015/0106467 A1* | 4/2015 | Robarts | G06F 17/30867 |
| | | | 709/207 |
| 2015/0160019 A1* | 6/2015 | Biswal | G01C 21/26 |
| | | | 701/1 |
| 2015/0195406 A1* | 7/2015 | Dwyer | H04M 3/5175 |
| | | | 379/265.07 |
| 2015/0266377 A1* | 9/2015 | Hampiholi | B60K 35/00 |
| | | | 455/466 |
| 2015/0287086 A1* | 10/2015 | MacNeille | G06F 17/00 |
| | | | 705/14.62 |
| 2015/0324927 A1* | 11/2015 | Collopy | G06Q 40/08 |
| | | | 705/4 |
| 2015/0341290 A1 | 11/2015 | Cherifi et al. | |
| 2015/0358456 A1* | 12/2015 | Prakah-Asante | B60K 28/02 |
| | | | 455/418 |
| 2016/0065516 A1 | 3/2016 | Miller et al. | |
| 2016/0150070 A1* | 5/2016 | Goren | H04W 4/029 |
| | | | 455/404.2 |
| 2016/0183068 A1* | 6/2016 | Shen | H04W 4/12 |
| | | | 455/466 |
| 2016/0364678 A1* | 12/2016 | Cao | G06Q 10/083 |
| 2016/0364679 A1* | 12/2016 | Cao | G06Q 10/083 |
| 2016/0364812 A1* | 12/2016 | Cao | G06Q 50/01 |
| 2016/0364823 A1* | 12/2016 | Cao | G06Q 50/30 |
| 2017/0011232 A1* | 1/2017 | Xue | H04M 3/5175 |
| 2017/0013127 A1* | 1/2017 | Xue | H04M 3/5175 |
| 2017/0026514 A1* | 1/2017 | Dwyer | H04M 3/5175 |
| 2017/0075740 A1* | 3/2017 | Breaux | G06F 9/546 |
| 2017/0134565 A1* | 5/2017 | Crowe | H04M 1/72577 |
| 2017/0146801 A1* | 5/2017 | Stempora | G02B 27/0172 |
| 2017/0203767 A1* | 7/2017 | Tibbitts | B60W 40/09 |
| 2017/0305349 A1* | 10/2017 | Naboulsi | B60R 1/04 |
| 2017/0309092 A1* | 10/2017 | Rosenbaum | G07C 5/008 |
| 2017/0364821 A1* | 12/2017 | Mathur | G06N 99/005 |

OTHER PUBLICATIONS

List of IBM Patents or Patent Applications Treated As Related dated Nov. 30, 2017, pp. 2.

* cited by examiner

VEHICLE ELECTRONIC RECEPTIONIST FOR COMMUNICATIONS MANAGEMENT

BACKGROUND

This invention is directed to computers and more particularly to computer-implemented methods, computer program products and systems for an electronic receptionist for phone call and texting management in driving vehicles.

The use of phones and texting while driving cars can be dangerous in many scenarios. As cars become fully or partly autonomous, the use of such phones may have various different implications. Additionally, even hands-free interaction with a phone caller can be distracting. An undistracted driver typically reacts in one second. The change in reaction time of drivers is known to be for DUI: 13%-21%, hands-free phone: 27%, texting: 37%, and hand-held phone: 46%.

Prior art exists for detecting motion of a cell phone and disabling the use of the cell phone while moving or driving. Other prior art exists for an automotive cellular blocker system embedded in the vehicle and communicating with the mobile communication device. Similarly, systems exist that prevent a vehicle occupant from text messaging while driving.

In one approach a system is provided for delivering messages to a user based on their activity status. When an incoming message for a driver of the vehicle is received, the system determines if the driver is experiencing a high-intensity situation; automatically responding to the incoming message with a reply message to the sender of the incoming message if the driver is experiencing the high-intensity situation, and automatically notifying the driver, after the high-intensity situation has ended, that the incoming message was received. The approach includes determining the existence of an operating situation, determining an operator cognitive load and determining a response to the operating situation based in part on the operator cognitive load.

The prior art systems do not take into consideration the content and nature of the incoming communication, which can be a major influence on the action that should be taken in response to the incoming message.

SUMMARY

One embodiment of the present invention a computer implemented method for a receptionist function in cars for phone call and texting management includes steps for a method for communications management in driving vehicles. The method in one embodiment includes determining driving context of a moving vehicle, estimating a risk factor related to the operation of the vehicle based on the driving context, receiving an incoming communication directed to a mobile communication device within the vehicle, analyzing the incoming communication to determine a communication factor, and determining an electronic action in response to the incoming communication based on the driving context, the risk factor and the communication factor.

Other embodiments of the present invention include a computer program product and a computer implemented system

BRIEF DESCRIPTION OF THE DRAWINGS

Further features as well as the structure and operation of various embodiments are described in detail below with reference to the accompanying drawings. In the drawings, like reference numbers indicate identical or functionally similar elements.

DETAILED DESCRIPTION

Figure 1:
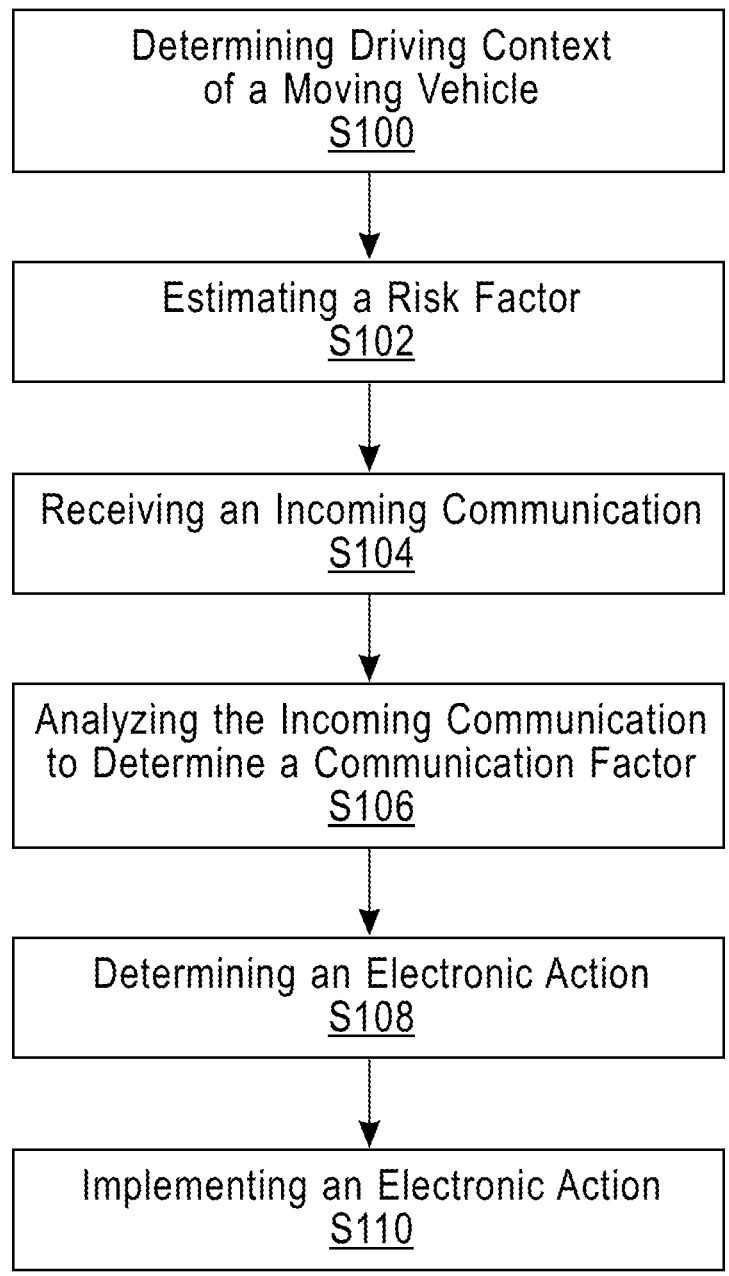
FIG. 1 depicts one embodiment of a method of the present invention.

In some embodiments a method and system includes determining a driving context of a moving vehicle. The vehicle may be a traditional driver operated vehicle, an autonomous or self-driving vehicle, or a vehicle that combines both driving modes. The method and system also includes estimating a risk factor related to the operation of the vehicle based on the driving context, receiving an incoming communication directed to a mobile communication device within the vehicle, analyzing the incoming communication to determine a communication factor, and determining an electronic action in response to the incoming communication based on the driving context, the risk factor and the communication factor. The method and system provides an electronic receptionist that takes an action based on driving context, vehicle operation risk and rules for determining the action. The methods and system have utility even for hands-free call use.

In some embodiments, the context may include the mode the vehicle is driving in, for example, self-driving, or manual driving. In some embodiments, the context may also include one or more of road conditions, traffic conditions, traffic flow, changing lanes, merging, school zone, history of accidents, current destination, distractions in the car, weather, and the cognitive state of the driver or passenger of a self-driving vehicle. The history of accidents may include one or more of accidents on a given roadway or of a particular driver. In some embodiments, the context may include the name of the person calling or sending a message. In some embodiments, the context data may be obtained from sensors providing data such as, driver biometric information, vehicle speed information, location information, proximity information, motion information, position information and temporal information.

In some embodiments, the risk may be based on risk of accident, risk of cognitive overload, risk of waking someone who is sleeping in a self-driving car.

In some embodiments, an incoming voice or text message may be analyzed to determine a communication factor used in determining the electronic action to be taken by the electronic receptionist. In some embodiments, the communication factor of the incoming message may be determined using natural language processing and/or speech recognition to determine the content of the message. In some embodiments, the tone of the message may be determined using tone analysis. In some embodiments, the communication factor includes the cognitive state of the caller, which can be estimated based on real-time analysis or on a history of interactions between the driver and the caller.

The electronic action may be any one or more of: intercepting a call, taking a message, sending an automated reply, reading or announcing the message, block driver from texting, delay the message until the vehicle stops, present the message on a display panel, redirect the message to another, switching the car to self-driving mode, or asking the driver to pull over before a message is relayed.

By including the communication factor in the rules for determining an electronic action, the electronic receptionist has the ability to assess the nature of a call or text message and to take action to ensure that the level of attention required to address the need of the caller is available when presented without sacrificing the safety of the driver or the convenience of the passenger of a self-driving vehicle. In this way, excessive demands and distractions on the driver or the passenger are minimized by the ability of the electronic receptionist to determine the appropriate action.

FIG. 1 depicts one embodiment of a method for communications management in driving vehicles in accordance with the present invention. In step S100 the driving context of a moving vehicle is determined. In step S102, a risk factor related to the operation of the vehicle based on the driving context is estimated. In step S104, an incoming communication directed to a mobile communication device within the vehicle is received. In step S106, the incoming communication is analyzed to determine a communication factor. In step S108, an electronic action in response to the incoming communication based on the driving context, the risk factor and the communication factor is determined. In step S110, the electronic action is implemented.

In some embodiments, the rules for determining an electronic action in response to the incoming communication based on the driving context, the risk factor and the communication factor may include using the level of urgency of the incoming communication to determine whether to alert the driver and request the driver to pull over before receiving a distressful message, ensuring the safety of the driver. In some embodiments, the rules cause the electronic receptionist to become more activist in shielding the driver or passenger based on risk assessment. For example, if the risk is greater, the receptionist may be more assertive about not letting texts or calls come through. In one example, the receptionist may deflect an incoming call if the person in the car is very much engaged with some media presented on the cars' infotainment system or radio. In another example, the affect on the cognitive state of the driver, if engaging in a conversation with a particular caller, can be estimated.

In another example, if the car is not moving e.g. parked, its level of being an activist may decrease. A smart phone may automatically determine the location of a parked vehicle by monitoring a received signal associated with the vehicle and a motion of the smartphone.

In some embodiments, the rules for determining the electronic action of the electronic receptionist are different for manual driving, autonomous driving, and semi-autonomous driving.

In some embodiments, the rules for determining the electronic action includes applying an adjustable weight factor to each of the driving context, the risk factor and the communication factor in determining the electronic action, the weight factors being adjustable based on driver preferences.

In some embodiments, the rules for determining an electronic action may have the electronic receptionist assume some security guard access control functions for a person in car by observing and reporting any unusual or suspicious persons or activities near a car.

In some embodiments, the rules include controlling and/or changing the "personality" of the electronic receptionist. For example, the electronic action may include a verbal response which can give the impression of having a positive attitude and dependability. In some embodiments, the rules include the electronic receptionist having a respect for confidentiality and discretion.

In some embodiments, the rules have the electronic receptionist act as a gatekeeper, understanding in varying degree the requirements of the driver or passenger, and with an ability through this understanding to decide, based on the communication factor, which messages are most appropriate for allocation of the driver's or passenger's time, with consideration of risk and context. In some embodiments, the rules may allow electronic receptionists to interact with other receptionists in other vehicles on the road.

In some embodiments, the callers may make queries to the car and receive answers from a mobile communication device embedded within the vehicle. Callers may make such queries directed to the vehicle, such as: When will the driver or the self-driving car arrive at home? Can the driver/passenger talk or text now? When might the driver/passenger be able to talk or text? Is it raining badly where vehicle is driving? How fast is the vehicle driving? Where is the vehicle's destination? Did the vehicle arrive at a specific location and did the driver/passenger exit the vehicle at that location? The electronic receptionist responds directly to the callers queries based on the context, risk and rules without intervention of the driver or passenger in the vehicle. For example, callers may make requests to add items to an errand list of the driver and this may be done without alerting the driver and diverting focus from driving. The electronic receptionist may provide information to a family member or other authorized people regarding possible arrival time at a destination, or providing a text message to the sender.

In some embodiments, the vehicle electronic receptionist may determine who is a passenger or driver by querying an ID associated with a smart phone.

The electronic receptionist rules can evolve through time. The system may learn, for example, whether a driver or passenger wants to be interrupted or not during a drive, and under what circumstances the disruption could occur. The level of activist function of the electronic receptionist may be learned and/or controlled.

In some embodiments, machine learning is used to enhance the electronic receptionist based on the context-based learning of driver distractions and anticipated cognitive outcomes of a communication. In some embodiments, a machine learning algorithm correlates driving behavior and performance with the context and content and tone of the communication. In one example, the electronic receptionist may learn that given a text message, having a specific context (driving home from work) (from a manager at work) and communication factor (angry tone), may have previously caused, when announced, a decrease in driving performance and an undue urge on the part of the driver to text while driving. A different message context (from a spouse) and communication factor (about groceries) may have not caused any decrease in driving performance. In this way, the electronic receptionist learns through contextual and text analytics to vector different messages in different ways to the driver in order to ensure the driver is always able to respond appropriately and in a safe manner to the message.

In some embodiments, the electronic receptionist includes a traditional reinforcement machine learning system, in which the agent is the receptionist and the action it chooses is the level of alerting and relaying of certain messages to the driver. The reward of the system, in this case, is the maintenance by the driver of good driving behavior, given the state of the driver's condition and the context (including text semantic analysis of the content) of the message. Optimization then proceeds to choose the appropriate receptionist action given different contexts.

In some embodiments, the electronic receptionist may be implemented in a cloud computing environment. In some embodiments, the driving context of the vehicle may be determined using an internet of things system.

Figure 2:
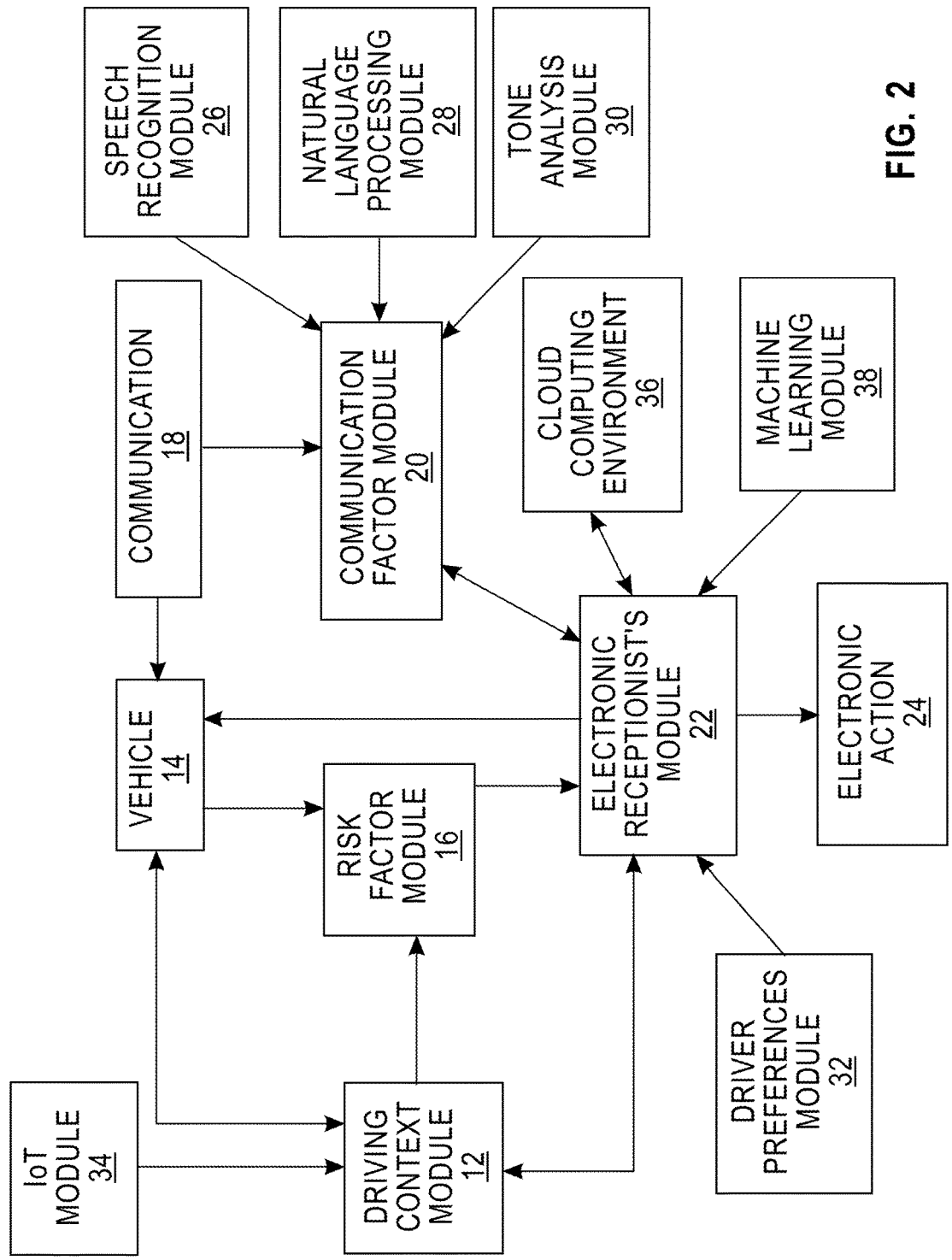
FIG. 2 depicts one embodiment of a system of the present invention.

FIG. 2 depicts one embodiment of a system of the present invention. A driving context module 12 determines the driving context of a moving vehicle 14. A risk factor module 16 estimates a risk factor related to the operation of the vehicle 14 based on the driving context determined by driving context module 12. An incoming communication 18 directed to a mobile communication device within the vehicle 14 is received by vehicle 14. The communication 18 is also received by communication factor module 20. The incoming communication 18 is analyzed by communication factor module 20 to determine a communication factor. An electronic receptionist's module 22 determines an electronic action 24 in response to the incoming communication 18 based on the input from driving context module 12, the risk factor module 16 and communication factor module 20. In one embodiment, receptionist module 22 is included in program module 102 of FIG. 5 described later.

In some embodiments, communication factor module 20 determines the communication factor based on speech recognition module 26, natural language processing module 28 and tone analysis module 30.

Speech recognition software converts speech to text to provide speech transcription capability. To transcribe the human voice accurately, the speech to text software leverages machine intelligence to combine information about grammar and language structure with knowledge of the composition of the audio signal. Speaker recognition can also be applied to differentiate between one person talking and the other voices in an environment, using a digital representation of one's unique vocal features. Recognizing the speaker includes the task of translating speech in systems that have been trained on specific person's voices.

Tone analysis refers to the use of natural language processing, text analysis, computational linguistics, and biometrics to systematically identify, extract, quantify, and study affective states and subjective information. In some embodiments, tone analysis is performed by the IBM Watson Tone Analyzer™ service. Relying on the scientific findings from psycholinguistics research, the Tone Analyzer™ infers people's personality characteristics, their thinking and writing styles, their emotions, and their intrinsic needs and values from text.

Natural language processing (NLP) is the ability of a computer program to understand human speech as it is spoken. Current approaches to NLP are based on machine learning that examines and uses patterns in data to improve a program's own understanding. In some embodiments, unsupervised and semi-supervised learning algorithms are used. Such algorithms are able to learn from data that has not been hand-annotated with the desired answers, or using a combination of annotated and non-annotated data. In some embodiments, deep learning techniques for several natural language tasks, for example in language modeling, parsing and many others.

In some embodiments, the electronic receptionist module 22 receives an input from a driver preferences module 32. The electronic action is determined based on applying an adjustable weight factor to each of the driving context, the risk factor and the communication factor in determining the electronic action, the weight factors being adjustable based on the driver preferences.

In some embodiments, the determining driving context of the moving vehicle 14 is determined by the driving context module 12 based on inputs from the internet of things module 34. In some embodiments, the electronic receptionist module 22 is implemented in a cloud computing environment 36.

In some embodiments, the electronic receptionist module 22 determines the electronic action using machine learning module 38. In some embodiments, machine learning module 38 learns based on past driver performance correlated with the corresponding driving context, the risk factor and the communication factor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 3:
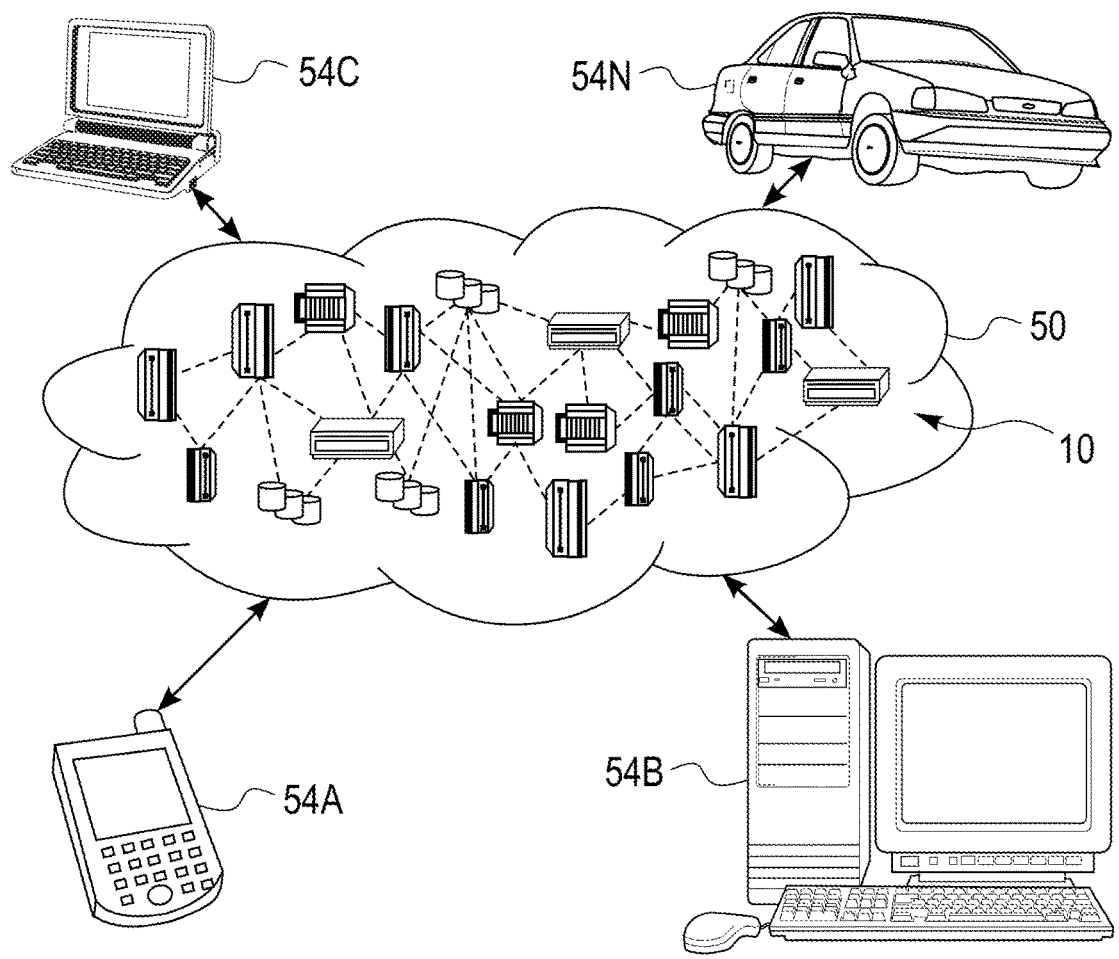
FIG. 3 depicts a cloud computing environment according to an embodiment of the present invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
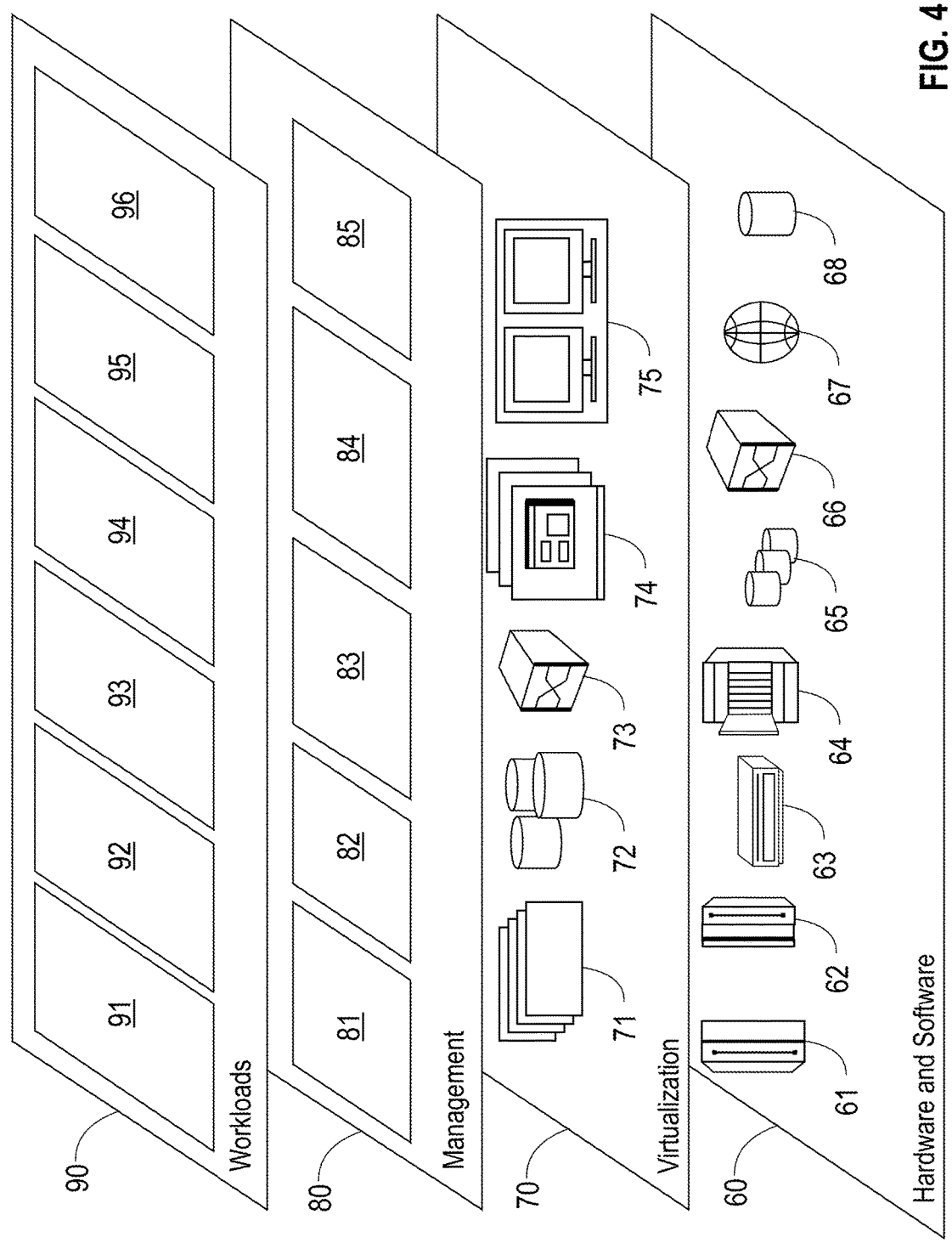
FIG. 4 depicts abstraction model layers according to an embodiment of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and electronic receptionist 96.

Figure 5:
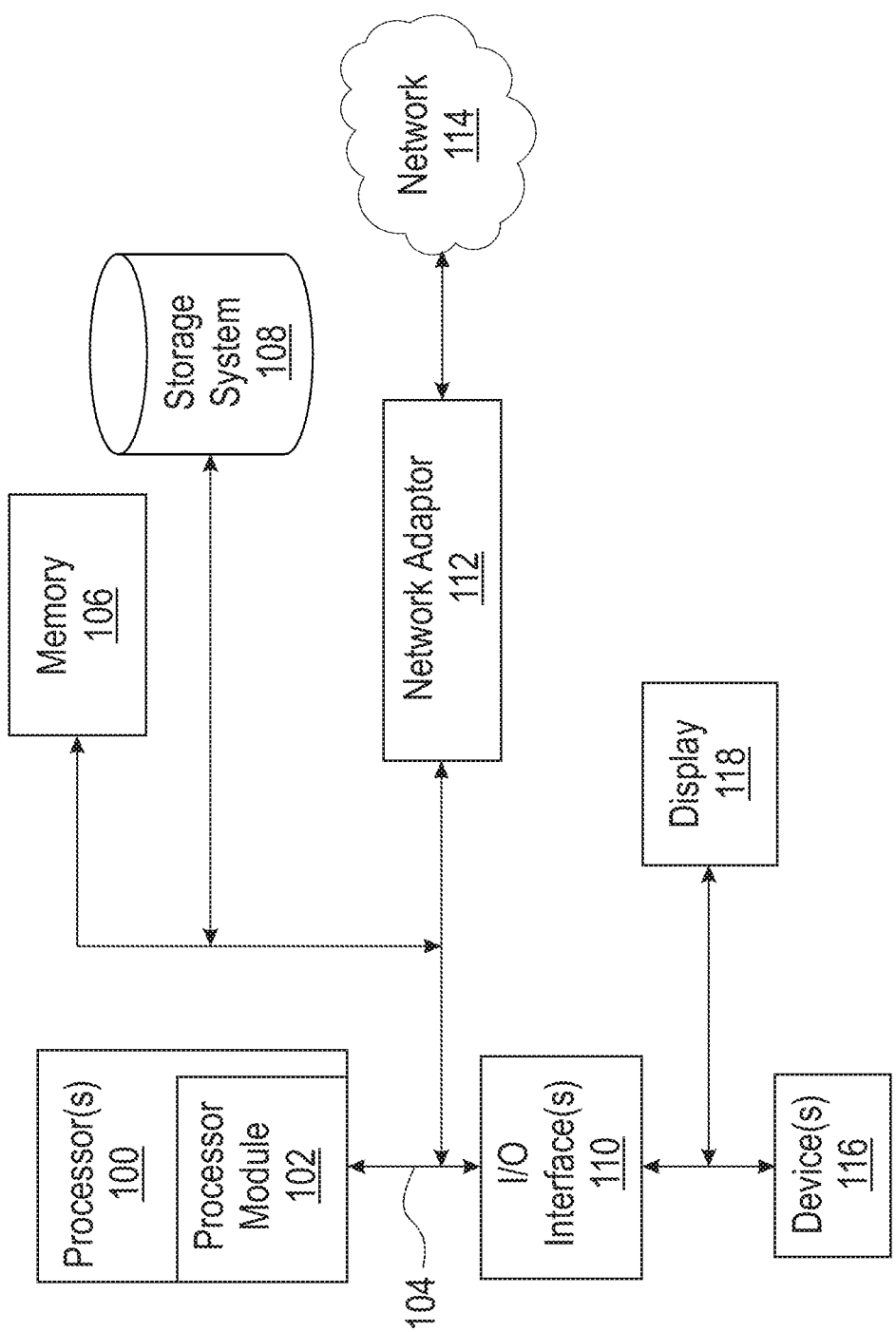
FIG. 5 depicts an exemplary computing system in accordance with the present invention.

FIG. 5 illustrates a schematic of an example computer or processing system that may implement the method for an electronic receptionist for phone call and texting management in driving vehicles in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer implemented method for communications management in driving vehicles comprising:
    determining driving context of a moving vehicle;
    estimating a risk factor related to the operation of the vehicle based on the driving context;
    receiving an incoming communication directed to a mobile communication device within the vehicle;
    analyzing the incoming communication to determine a communication factor; and
    determining an electronic action in response to the incoming communication based on the driving context, the risk factor and the communication factor,
    wherein determining the electronic action includes applying an adjustable weight factor to each of the driving context, the risk factor and the communication factor in determining the electronic action, the weight factors being adjustable based on driver preferences.

2. The method of claim 1, wherein determining the communication factor comprises performing analytics on the incoming message, the analytics being selected from the group consisting of speech recognition, natural language processing and tone analysis.

3. The method of claim 2, wherein determining the communication factor further comprises analyzing content of the incoming communication identified from the speech recognition and natural language processing analytics.

4. The method of claim 3, wherein determining the communication factor further comprises determining the cognitive state of a sender of the incoming communication.

5. The method of claim 1, wherein the driving context is determined from data selected from the group consisting of mode vehicle is driving, road conditions, traffic conditions, history of accidents, current destination, distractions in the vehicle, weather, cognitive state of a driver of the vehicle, cognitive state of a passenger in the vehicle and a name of a sender of the incoming communication.

6. The method of claim 1, wherein the risk factor is estimated from data selected from the group consisting on risk of accident, risk of cognitive overload of a driver of the vehicle, risk of waking a passenger sleeping in a self-driving vehicle.

7. The method of claim 1, wherein the electronic action is selected from the group consisting of taking a message, providing a silent or audible notification to a driver of the vehicle, providing an automated response to the sender of the incoming communication.

8. The method of claim 1, wherein the determining driving context of a moving vehicle is determined based on the internet of things and the determining an electronic action in response to the incoming communication based on the driving context, the risk factor and the communication factor is implemented in a cloud computing environment.

9. The method of claim 1, wherein determining the electronic action includes machine learning based on past driver performance correlated with the corresponding driving context, the risk factor and the communication factor.

10. A computer implemented method for communications management in driving vehicles comprising:
   determining driving context of a moving vehicle;
   estimating a risk factor related to the operation of the vehicle based on the driving context;
   receiving an incoming communication directed to a mobile communication device within the vehicle;
   analyzing the incoming communication to determine a communication factor; and
   determining an electronic action in response to the incoming communication based on the driving context, the risk factor and the communication factor,
   wherein determining the electronic action includes machine learning based on past driver performance correlated with the corresponding driving context, the risk factor and the communication factor.

11. The method of claim 10, wherein determining the communication factor comprises performing analytics on the incoming message, the analytics being selected from the group consisting of speech recognition, natural language processing and tone analysis.

12. The method of claim 11, wherein determining the communication factor further comprises analyzing content of the incoming communication identified from the speech recognition and natural language processing analytics.

13. The method of claim 12, wherein determining the communication factor further comprises determining the cognitive state of a sender of the incoming communication.

14. The method of claim 10, wherein the driving context is determined from data selected from the group consisting of mode vehicle is driving, road conditions, traffic conditions, history of accidents, current destination, distractions in the vehicle, weather, cognitive state of a driver of the vehicle, cognitive state of a passenger in the vehicle and a name of a sender of the incoming communication.

15. The method of claim 10, wherein the risk factor is estimated from data selected from the group consisting on risk of accident, risk of cognitive overload of a driver of the vehicle, risk of waking a passenger sleeping in a self-driving vehicle.

16. The method of claim 10, wherein the electronic action is selected from the group consisting of taking a message, providing a silent or audible notification to a driver of the vehicle, providing an automated response to the sender of the incoming communication.

17. The method of claim 10, wherein determining the electronic action includes applying an adjustable weight factor to each of the driving context, the risk factor and the communication factor in determining the electronic action, the weight factors being adjustable based on driver preferences.

18. The method of claim 10, wherein the determining driving context of a moving vehicle is determined based on the internet of things and the determining an electronic action in response to the incoming communication based on the driving context, the risk factor and the communication factor is implemented in a cloud computing environment.

* * * * *